Oct. 6, 1959 — W. P. SCHMITTER — 2,907,188
FLEXIBLE SHAFT-COUPLING
Filed Sept. 11, 1958

INVENTOR
WALTER P. SCHMITTER

BY Quarles, Fox, Seidel
Bateman & Hoar
ATTORNEYS

United States Patent Office 2,907,188
Patented Oct. 6, 1959

2,907,188

FLEXIBLE SHAFT-COUPLING

Walter P. Schmitter, Wauwatosa, Wis., assignor to The Falk Corporation, Milwaukee, Wis., a corporation of Wisconsin Application September 11, 1958, Serial No. 760,342

6 Claims. (Cl. 64—11)

This invention relates to flexible shaft-couplings, the purpose of which is to couple together two substantially coaxial shafts in such manner as to provide torsional resiliency (which may be defined as the ability to spread peak or shock loads over a relatively long increment of time), and in such manner as to accommodate considerable misalignment (both angular and parallel) of the axes of the two shafts, both of which features greatly reduce the stresses in the thus connected machinery.

It is the principal object of the present invention to provide a flexible shaft-coupling which shall accomplish the above two functions by inexpensive and comparatively simple means.

More particularly the invention relates to an improvement on a particular type of resilient coupling which may be described as comprising: a pair of spaced apart substantially coaxial coupling hubs, and each such hub being provided adjacent the face thereof which faces the other such hub with a series of circumferentially spaced radially outwardly projecting axially extending teeth, which teeth define between them a series of axially extending peripheral grooves; means for securing these hubs to the ends of their respective shafts to rotate therewith; and a resilient tubelike sleeve, one end of which surrounds the toothed portion of one hub and the other end of which surrounds the toothed portion of the other hub, said sleeve being provided at least adjacent each end thereof with a series of circumferentially spaced inwardly radially projecting axially extending teeth which fit into the grooves of the adjacent hub, and which teeth define between them a series of axially extending grooves into which fit the teeth of the adjacent hub.

It should be noted that this type of coupling takes up shock by twisting the resilient sleeve member rather than by squeezing pieces of resilient material between alternating axial projections from the two hub members: i.e., operates by twisting the resilient member rather than by compression thereof: quite a different operation. The "twist" type has advantages over the "compression" type, including the advantage of larger angle of relative twist of the two hubs for shock take up, thus increasing the resiliency, and the advantage of permitting a greater misalignment (both angular and parallel) of axes of the two shafts. The sleeve is free to float, so that misalignment is compensated for between the faces of the teeth, equally divided between the driving hub member and the driven hub member.

In spite of the advantages of flexible couplings of the "twist" type, it has been found that under overloads even only moderately more than normal the resilient sleeve tends to expand, and the teeth of the flexible sleeve tend to bend in the direction in which they are being pushed by the teeth of the hubs, and thus tend to roll out of engagement. This results in rapid wear of the teeth of the sleeve, and frequently even in complete disengagement between hubs and sleeve.

Building the hub teeth with diverging, instead of converging, sides has been found not to constitute a complete solution of this problem, for this alone is not sufficient to overcome the tendency of the flexible teeth to roll out of engagement.

Accordingly a further object of this present invention is to effect the complete solution of this problem.

The solution consists in so completely interlocking the teeth of the hubs with the teeth of the resilient sleeve, even initially, that there will be not even a tendency of the teeth to disengage, under the elastic deformation which is essential to the operation of a "twist" type flexible coupling. This will be explained in more detail as the description progresses.

Other objects and advantages will appear in the description which follows.

In the description reference is made to the accompanying drawings forming a part hereof, in which there is shown by way of illustration and not of limitation a certain specific form in which the machine of the present invention may be embodied.

In the drawings.

Throughout the drawings the same reference numeral is applied to the same member or to similar members.

Figure 2:
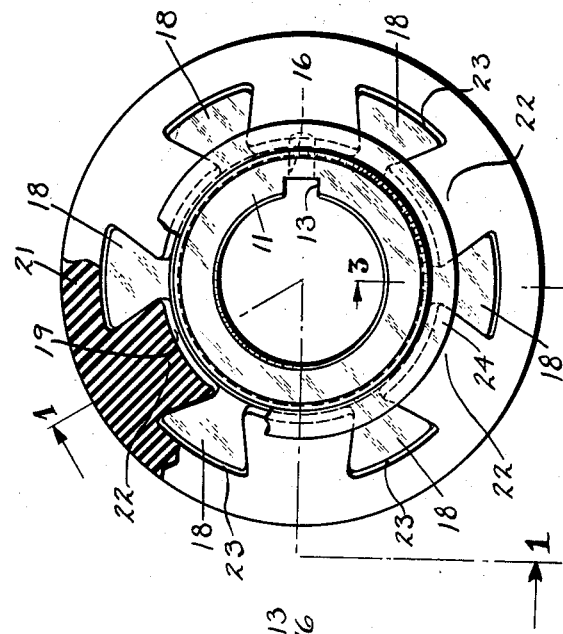
Fig. 2 is an end elevation, with parts broken away and parts shown in section, viewed from the left in Fig. 1.
Figure 3:
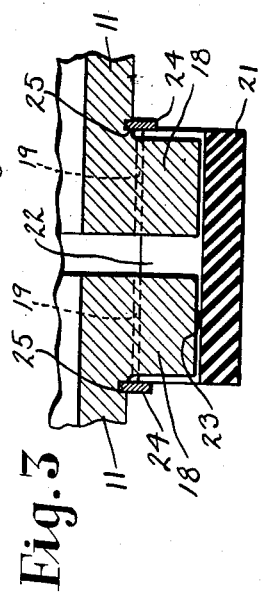
Fig. 3 is a partial vertical section, seen as though cut along the line 3—3 of Fig. 2.
Figure 1:
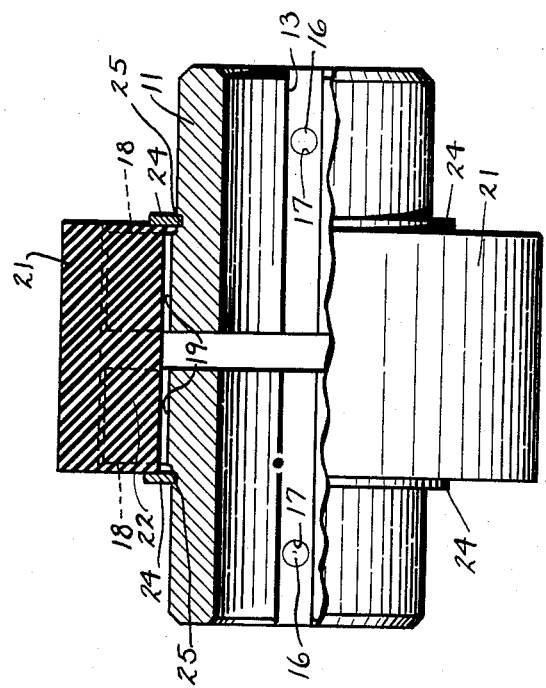
Fig. 1 is a side elevation of a coupling embodying the invention in unloaded condition, with parts broken away and parts shown in section, seen as though cut along the line 1—1 of Fig. 2.

Referring now to the drawings, it will be seen that the numeral 11 represents each of two coupling hubs, preferably of metal or other non-resilient material. These are hollow, and each is intended to be fitted over the end of one of the two shafts (not shown) to be coupled. Each hub has a keyway 13, and each of the shafts should have a cooperating keyway. A key (not shown) should fit in each keyway 13 and its cooperating keyway, the key being secured in place by a setscrew 16, threaded into a threaded hole 17 in the hub. The keyways, key, and setscrew together constitute means for securing each hub to its respective shaft to rotate therewith.

On each hub 11, adjacent that face thereof which faces the other hub, there is a series of circumferentially spaced radially outwardly projecting axially extending teeth 18, which teeth define between them a series of axially extending peripheral grooves 19.

The two hubs 11 are drivingly connected together by a resilient sleeve 21, one end of which surrounds the toothed portion of one hub, and the other end of which surrounds the toothed portion of the other hub. This sleeve is of rubber or rubberlike material, either or not reinforced by cording, preferably some oil resisting synthetic rubber substitute such as "Enrup," uncorded.

On the inner surface of sleeve 21 there is a series of circumferentially spaced radially inwardly projecting axially extending teeth 22, which teeth define between them a series of axially extending grooves 23.

Teeth 18 of hubs 11 fit snugly into grooves 23 between teeth 22 of sleeve 21; and teeth 22 of sleeve 21 fit snugly into grooves 19 between teeth 18 of hub 11.

It is important that a toothed portion of each end of sleeve 21 surround at least a substantial extent of the toothed portion of each hub 11; in fact, the entire length of sleeve 21 should preferably be toothed, for simplicity in manufacture.

Preferably there should be a substantial empty space at the bottom of each groove 23 of sleeve 21 beyond the crest of the corresponding tooth 18 of hub 11. And preferably there should be an empty space at the bottom of each groove 19 of each hub 11 beyond the crest of the corresponding tooth 22 of sleeve 21. The object of these empty spaces is to permit elastic deformaton of the material of the sleeve so that the coupling will articulate freely under misalignment of the two shafts and under changes in load.

The most important feature of the present invention is that the teeth 22 of resilient sleeve 21 and the teeth 18 of each hub 11 are mortised together against relative outward radial movement of the sleeve teeth with respect to the adjoining hub teeth. More specifically this is effected by the fact that both sorts of teeth are wider remote from their bases than adjacent their bases.

It is not sufficient that merely the hub teeth 18 possess this characteristic. For unless the hub teeth have considerably divergent sides, the sides of the sleeve teeth 22 could still be convergent and hence permit disengagement under shock loads and overloads. Accordingly the sleeve teeth too must be built with divergent sides.

For 6-toothed hubs and 6-toothed sleeve, with the bottoms of the grooves of the sleeve and the bases of the teeth of the sleeves of approximately equal width, a divergence of approximately 20 degrees of the sides of the sleeve teeth has been found to be ideal.

This complete interlocking of the two kinds of teeth resists any tendency of the teeth of the resilient sleeve to roll out of engagement with the teeth of either hub, under the influence of the pressure of the latter.

Sleeve 21 is restrained from sliding along either hub 11 away from the juncture, by one of two split retaining rings 24 snapped into groove 11 on each hub.

From the foregoing description it will be readily evident that this invention affords a new and useful flexible shaft-coupling of the twisting resilient type.

Now that one embodiment of the invention has been shown and described, it is to be understood that the invention is not to be limited to the specific form or arrangement of parts herein shown and described.

What is claimed is:

1. A flexible shaft-coupling, comprising: a pair of spaced apart substantially coaxial coupling hubs, each such hub being provided adjacent the face thereof which faces the other such hub with a series of circumferentially spaced radially outwardly projecting axially extending teeth, which define between them a series of axially extending peripheral grooves; means for securing these hubs to the ends of their respective shafts to rotate therewith; and a resilient tubelike sleeve, one end of which surrounds the toothed portion of one hub, and the other end of which surrounds the toothed portion of the other hub, said sleeve being provided at least adjacent each end thereof with a series of circumferentially spaced inwardly radially projecting axially extending teeth which fit into the grooves of the adjacent hub, and which teeth define between them a series of axially extending grooves, into which fit the teeth of the adjacent hub; said coupling being characterized by the fact that the teeth of the sleeve and the teeth of the hubs are wider remote from their bases then they are less remote from their bases.

2. A flexible shaft-coupling according to claim 1, wherein there is a substantial empty space between the bottom of each groove of each hub and the crest of the corresponding tooth of the sleeve.

3. A flexible shaft-coupling according to claim 1, wherein there is a substantial empty space between the crest of each tooth of each hub and the bottom of the corresponding groove of the sleeve.

4. A flexible shaft-coupling, comprising: a pair of spaced apart substantially coaxial coupling hubs, each such hub being provided adjacent the face thereof which faces the other such hub with a series of circumferentially spaced radially outwardly projecting axially extending teeth, which define between them a series of axially extending peripherial grooves; means for securing these hubs to the ends of their respective shafts to rotate therewith; and a resilient tubelike sleeve, one end of which surrounds the toothed portion of one hub, and the other end of which surrounds the toothed portion of the other hub, said sleeve being provided at least adjacent each end thereof with a series of circumferentially spaced inwardly radially projecting axially extending teeth which fit into the grooves of the adjacent hub, and which teeth define between them a series of axially extending grooves, into which fit the teeth of the adjacent hub; said coupling being characterized by the fact that the teeth of the sleeve and the teeth of the hubs are mortised together against relative outward radial movement of the sleeve teeth with respect to the adjoining hub teeth: such mortising comprising that the engaging sides of successive sleeve teeth and hub teeth are interlocked against such movement.

5. A flexible shaft-coupling, comprising: a pair of spaced apart substantially coaxial coupling hubs, each such hub being provided adjacent the face thereof which faces the other such hub with a series of circumferentially spaced radially outwardly projecting axially extending teeth, which define between them a series of axially extending peripheral grooves; means for securing these hubs to the ends of their respective shafts to rotate therewith; and a resilient tubelike sleeve, one end of which surrounds the toothed portion of one hub, and the other end of which surrounds the toothed portion of the other hub, said sleeve being provided at least adjacent each end thereof with a series of circumferentially spaced inwardly radially projecting axially extending teeth which fit into the grooves of the adjacent hub, and which teeth define between them a series of axially extending grooves, into which fit the teeth of the adjacent hub; said coupling being characterized by the fact that the teeth of the sleeve and the teeth of the hubs are mortised together against relative outward radial movement of the sleeve teeth with respect to the adjoining hub teeth; characterized further by the fact that there is a substantial empty space between the bottom of each groove of each hub and the crest of the corresponding tooth of the sleeve.

6. A flexible shaft-coupling, comprising: a pair of spaced apart substantially coaxial coupling hubs, each such hub being provided adjacent the face thereof which faces the other such hub with a series of circumferentially spaced radially outwardly projecting axially extending teeth, which define between them a series of axially extending peripheral grooves; means for securing these hubs to the ends of their respective shafts to rotate therewith; and a resilient tubelike sleeve, one end of which surrounds the toothed portion of one hub, and the other end of which surrounds the toothed portion of the other hub, said sleeve being provided at least adjacent each end thereof with a series of circumferentially spaced inwardly radially projecting axially extending teeth which fit into the grooves of the adjacent hub, and which teeth define between them a series of axially extending grooves, into which fit the teeth of the adjacent hub; said coupling being characterized by the fact that the teeth of the sleeve and the teeth of the hubs are mortised together against relative outward radial movement of the sleeve teeth with respect to the adjoining hub teeth; characteried further by the fact that there is a substantial empty space between the crest of each tooth of each hub and the bottom of the corresponding groove of the sleeve.

References Cited in the file of this patent

UNITED STATES PATENTS

| | | |
|---|---|---|
| 1,983,007 | Simons | Dec. 4, 1934 |
| 2,079,460 | Marty | May 4, 1937 |
| 2,271,568 | Olson | Feb. 3, 1942 |
| 2,859,599 | Case | Nov. 11, 1958 |